United States Patent [19]
Owaki

[11] Patent Number: 5,465,403
[45] Date of Patent: Nov. 7, 1995

[54] SHORTWAVE RADIO RECEIVER WITH TIMER RECEPTION MODE

[75] Inventor: Masanao Owaki, Kanagawa, Japan

[73] Assignee: Sony Corporation, Tokyo, Japan

[21] Appl. No.: 192,311

[22] Filed: Feb. 4, 1994

Related U.S. Application Data

[63] Continuation of Ser. No. 902,307, Jun. 22, 1992, abandoned.

[30] Foreign Application Priority Data

Jun. 28, 1991 [JP] Japan ................................. 3-185143

[51] Int. Cl.⁶ ........................................... H04B 1/16
[52] U.S. Cl. ............................ 455/186.1; 455/154.1; 455/181.1
[58] Field of Search .................. 455/181.1, 185.1, 455/186.1, 186.2, 158.1, 183.1, 154.1, 260, 165.1, 76, 179.1

[56] References Cited

U.S. PATENT DOCUMENTS

| | | | |
|---|---|---|---|
| 4,403,344 | 9/1983 | Yamada et al. | 455/181.1 |
| 4,706,121 | 11/1987 | Young | 455/186.1 |
| 4,969,209 | 11/1990 | Schwob | 455/186.1 |
| 5,001,775 | 3/1991 | Hayashi et al. | 455/186.1 |
| 5,023,938 | 6/1991 | Takegawa et al. | 455/186.1 |
| 5,101,508 | 3/1992 | Owaki | 455/181.1 |
| 5,195,134 | 3/1993 | Inoue | 455/186.1 |

FOREIGN PATENT DOCUMENTS

| | | |
|---|---|---|
| 3137047 | 3/1983 | Germany. |
| 0122309 | 10/1978 | Japan ................ 455/181.1 |
| 0119536 | 9/1981 | Japan ................ 455/181.1 |
| 0256877A3 | 2/1988 | Japan. |
| 0283234 | 11/1988 | Japan ................ 455/181.1 |
| 2003685 | 3/1979 | United Kingdom. |

OTHER PUBLICATIONS

Patent Abstracts of Japan, JP62140522, 24 Jun. 1987, Application No. JP850281300, Fujitsu Ten Ltd., Inv. N. Yuji, "Reserving Method for Broadcast Program", Pub. date: Aug. 8, 1989.

Primary Examiner—Reinhard J. Eisenzopf
Assistant Examiner—Nguyen Vo
Attorney, Agent, or Firm—Jerry A. Miller

[57] ABSTRACT

A radio receiver of synthesizer type having a phase-locked loop therein and capable of selecting a desired broadcasting station by frequency conversion of a reception signal in conformity with an oscillation signal obtained from the phase-locked loop. The receiver includes a data table including frequency data for receiving programs from broadcasting stations, and time data indicative of the broadcast start time of each station; a timer circuit; a memory for the timer; and station select keys. When desired frequency data has been selected out of the data table by depressing one of the select keys for timer reservation, the selected frequency data and the time data corresponding thereto are read out from the data table and are written in the timer memory.

12 Claims, 8 Drawing Sheets

| PAGE | FREQUENCY DIVISION RATIO N | START TIME BGNT | END TIME ENDT | RECEPTION FREQUENCY fr [kHz] | |
|---|---|---|---|---|---|
| 1 | 1526 | 0645 | 0715 | 7180 | ① |
| | 2006 | 0645 | 0715 | 9580 | ② |
| | 2481 | 2000 | 2030 | 11955 | ③ |
| | 3162 | 2000 | 2030 | 15360 | ④ |
| | | | | | ⑤ |
| 2 | 3127 | 0700 | 0900 | 15185 | ①—K₁ |
| | 3148 | 0700 | 0900 | 15290 | ②—K₂ |
| | 2933 | 0900 | 1300 | 14215 | ③—K₃ |
| | 3130 | 0900 | 1300 | 15200 | ④—K₄ |
| | 3122 | 2000 | 2400 | 15160 | ⑤—K₅ |
| 3 | ----- | ----- | ----- | ------- | |
| | ----- | | | | |
| | ----- | | | | |
| | ----- | | | | |
| | ----- | | | | |
| | ----- | | | | |
| 20 | ----- | ----- | ----- | ------- | ① |
| | ----- | | | | ② |
| | ----- | | | | ③ |
| | ----- | | | | ④ |
| | ----- | | | | ⑤ |

FIG. 6

| PAGE | FREQUENCY DIVISION RATIO N | START TIME BGNT | END TIME ENDT | RECEPTION FREQUEMCY fr [kHz] | |
|---|---|---|---|---|---|
| 1 | 1526 | 0645 | 0715 | 7180 | ← 1 |
| | 2006 | 0645 | 0715 | 9580 | ← 2 |
| | 2481 | 2000 | 2030 | 11955 | ← 3 |
| | 3162 | 2000 | 2030 | 15360 | ← 4 |
| | | | | | ← 5 |
| 2 | 3127 | 0700 | 0900 | 15185 | ← 1  K1 |
| | 3148 | 0700 | 0900 | 15290 | ← 2  K2 |
| | 2933 | 0900 | 1300 | 14215 | ← 3  K3 |
| | 3130 | 0900 | 1300 | 15200 | ← 4  K4 |
| | 3122 | 2000 | 2400 | 15160 | ← 5  K5 |
| 3 | ----- | ----- | ----- | -------- | |
| | ----- | | | | |
| | ----- | | | | |
| | ----- | | | | |
| | ----- | | | | |
| | : | | | | |
| 20 | ----- | ----- | ----- | -------- | ← 1 |
| | ----- | | | | ← 2 |
| | ----- | | | | ← 3 |
| | ----- | | | | ← 4 |
| | ----- | | | | ← 5 |

Ku △
Kd ▽

| N | 411 | 412 | - - - - - - | 6089 |
|---|---|---|---|---|
| fo (kHz) | 2055 | 2060 | - - - - - - | 30445 |
| fr (kHz) | 1605 | 1610 | - - - - - - | 29995 |

SHORTWAVE RADIO RECEIVER WITH TIMER RECEPTION MODE

This is a continuation of Ser. No. 07/902,307, filed on Jun. 22, 1992, now abandoned, which is hereby incorporated by reference.

BACKGROUND OF THE INVENTION

1. Field of the Invention

The present invention relates to a radio receiver and, more particularly, to a synthesizer type receiver having a function for reserved reception with a timer.

2. Description of the Prior Art

It is generally customary that a shortwave band is employed for overseas broadcasting, and some stations carry out daily broadcast according to such a schedule as shown in FIG. 9 for example.

In FIG. 9, hatched portions represent the time zones to perform broadcasting. In this example, one program of the same content is broadcast at two frequencies f1 and f2 during a time period T1, while a next program is broadcast at a frequency f2 during a time period T2, and another program is broadcast at a frequency f3 during a time period T3.

Therefore, in listening to the first broadcast during the time period T1, the better-conditioned one of the two frequencies f1 and f2 can be selected for reception. Meanwhile during the time periods T2 and T3, different programs are broadcast at the frequencies f2 and f3 individually, so that either of the programs is selectively receivable as desired.

Relative to methods for receiving a broadcast program, there is known a mode termed "timer reception" or "preset reception". In the timer reception mode, the frequency of a desired broadcast to be received is selectively preset in a receiver, and the start time of such broadcast is preset in a timer incorporated in the receiver ("timer reservation"). Then, upon arrival of the preset time, the desired broadcast of the selected frequency is received.

Therefore, according to such timer reception mode, any desired broadcast can be picked up from the beginning without fail.

However, in the case of FIG. 9 where programs are broadcast in a plurality of divided time zones from a single station at a plurality of frequencies, some intricacy is unavoidable in presetting the relevant frequency or the broadcast start time to execute a timer reservation. It is considerably difficult, even for a mania or veteran user, to properly set the desired frequency or broadcast start time, and the broadcast fails to be received completely if either of the frequency or the broadcast start time is mistaken.

OBJECT AND SUMMARY OF THE INVENTION

It is an object of the present invention to provide an improved radio receiver which is free from the drawbacks mentioned above.

According to one aspect of the present invention, there is provided a radio receiver of a synthesizer type with a PLL (phase-locked loop) wherein a desired station is selected by frequency conversion of a reception signal in conformity with an oscillation signal obtained from the PLL. The receiver comprises a data table including frequency data for receiving programs from broadcasting stations, and time data indicative of the broadcast start time of each station; a timer circuit; a memory for the timer; and station select keys.

When desired frequency data has been selected out of the data table by depressing one of the select keys for timer reservation, the selected frequency data and the time data corresponding thereto are written in the timer memory from the data table.

According to another aspect of the present invention, there is provided an improved radio receiver wherein, in a timer reception mode, the time indicated by the timer circuit is compared with the time data written in the timer memory, and when a coincidence is attained therebetween, the frequency data written in the timer memory is supplied to the PLL to thereby select the desired station.

When a desired broadcasting station to be received by means of the timer is designated by depressing any of the select keys, the frequency data of the selected station and the time data indicative of the program start time are transferred to the timer memory. And upon arrival of the time indicated by the data in the timer memory, the station of the frequency data transferred to the timer memory is picked up to consequently achieve the timer reception.

The above and other features and advantages of the present invention will become apparent from the following description which will be given with reference to the illustrative accompanying drawings.

BRIEF DESCRIPTION OF THE DRAWINGS

FIG. 6 shows an exemplary data table;

DESCRIPTION OF THE PREFERRED EMBODIMENTS

Hereinafter an exemplary embodiment of the present invention will be described in detail with reference to the accompanying drawings.

Figure 1:
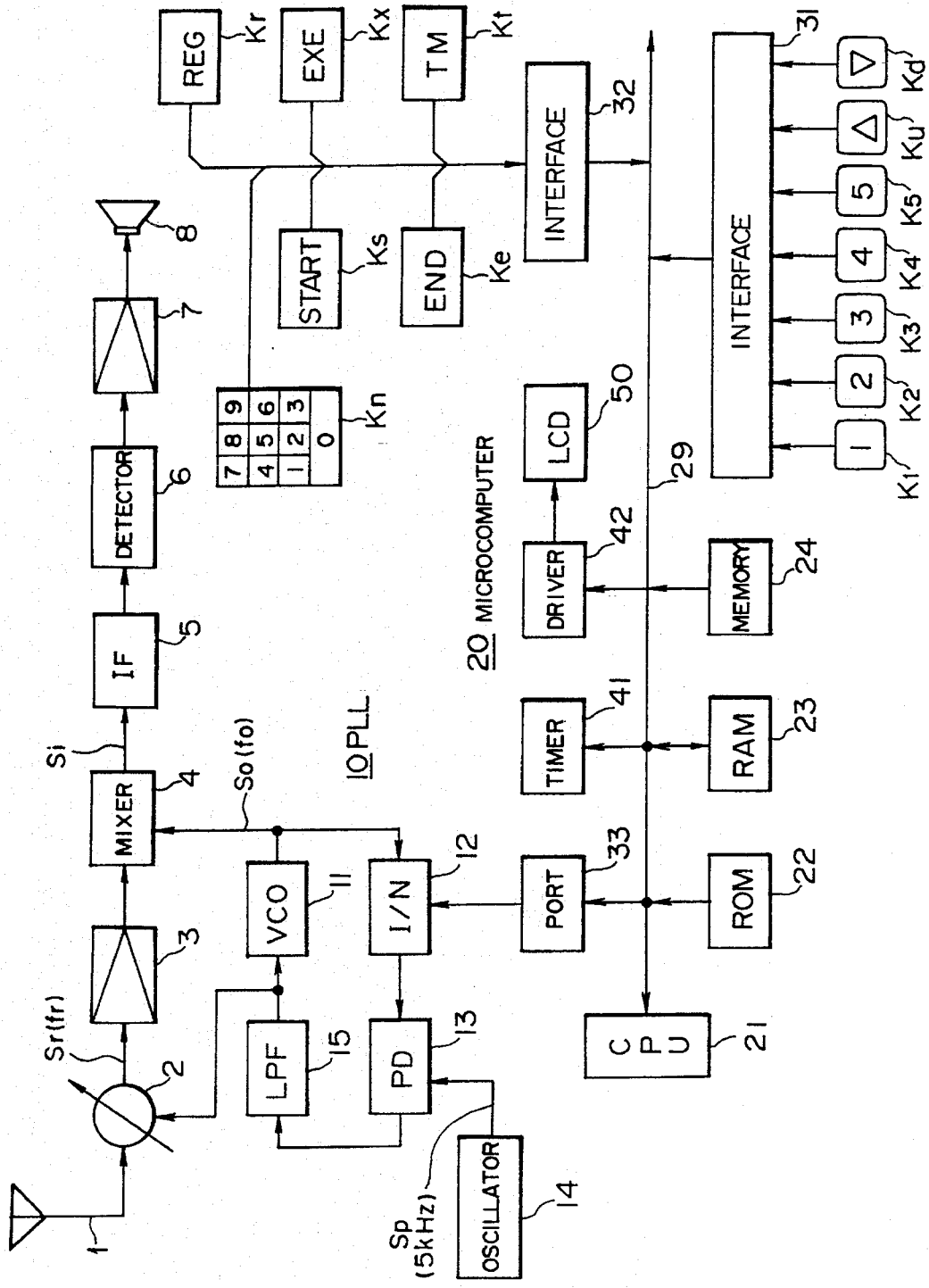
FIG. 1 is a block diagram of an embodiment representing the radio receiver of the present invention.
Figure 2:
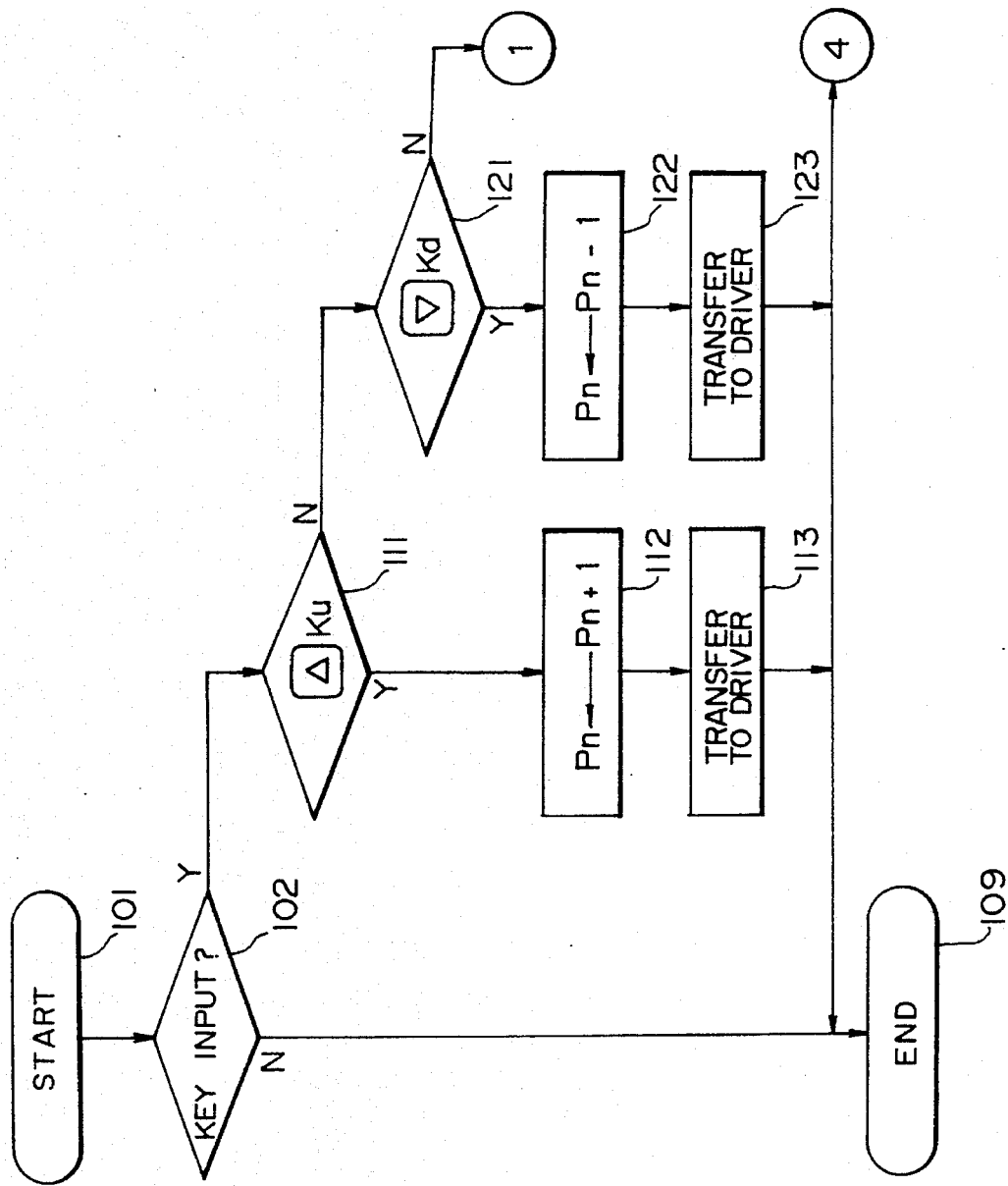
FIGS. 2 to 5 are flow charts of a processing routine sequentially showing the operation of the present invention.
Figure 3:
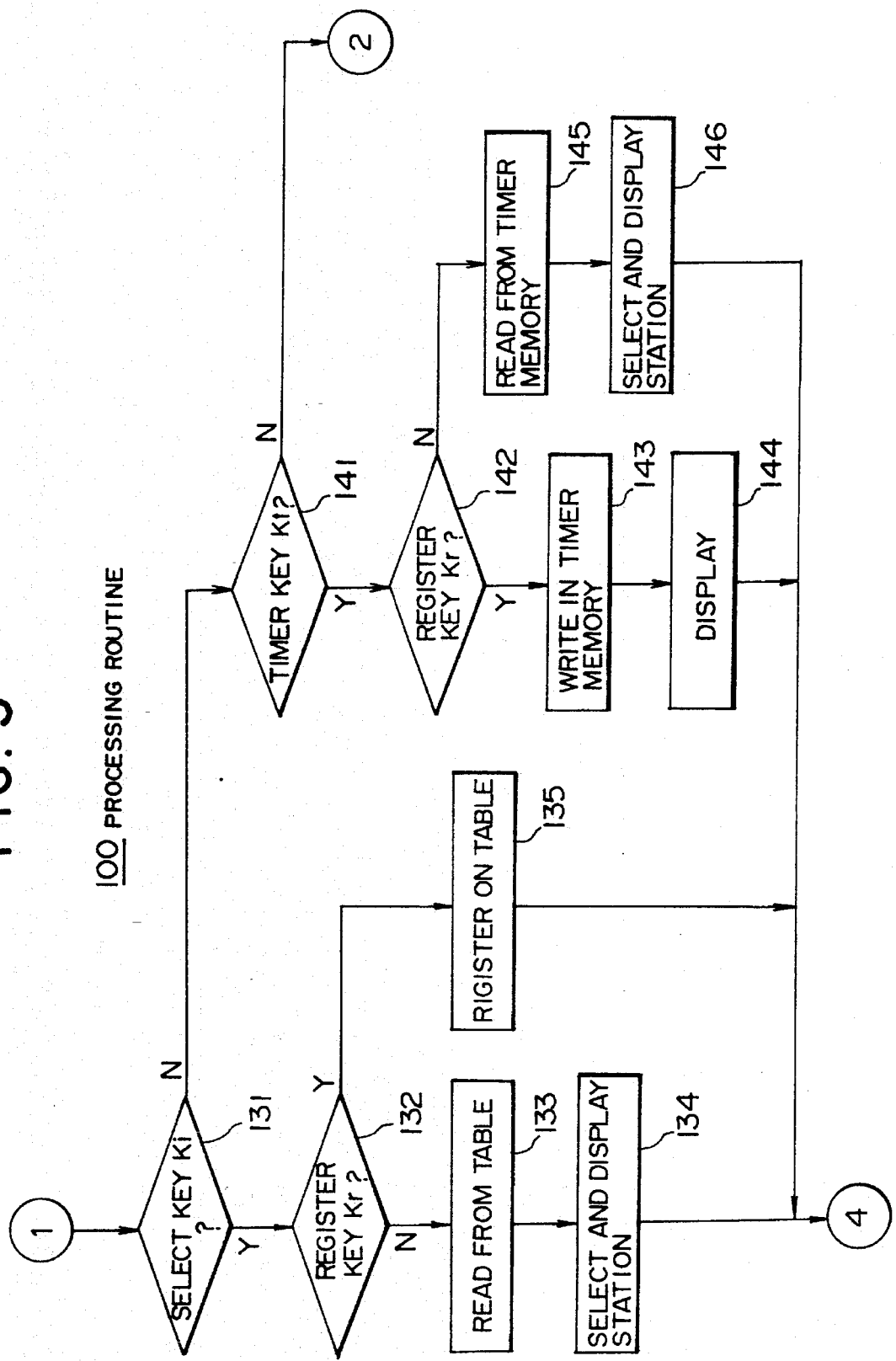
Figure 4:
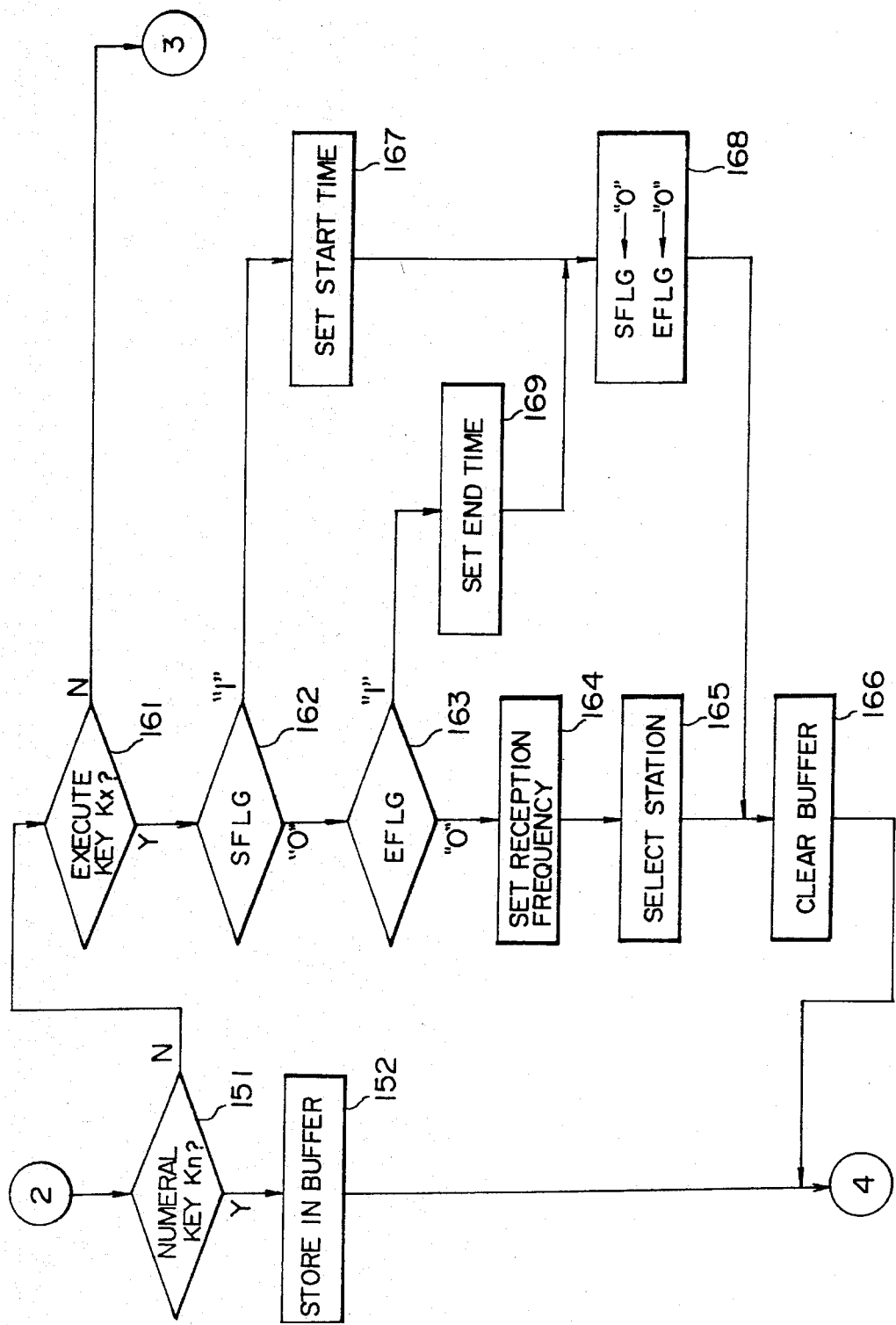
Figure 5:
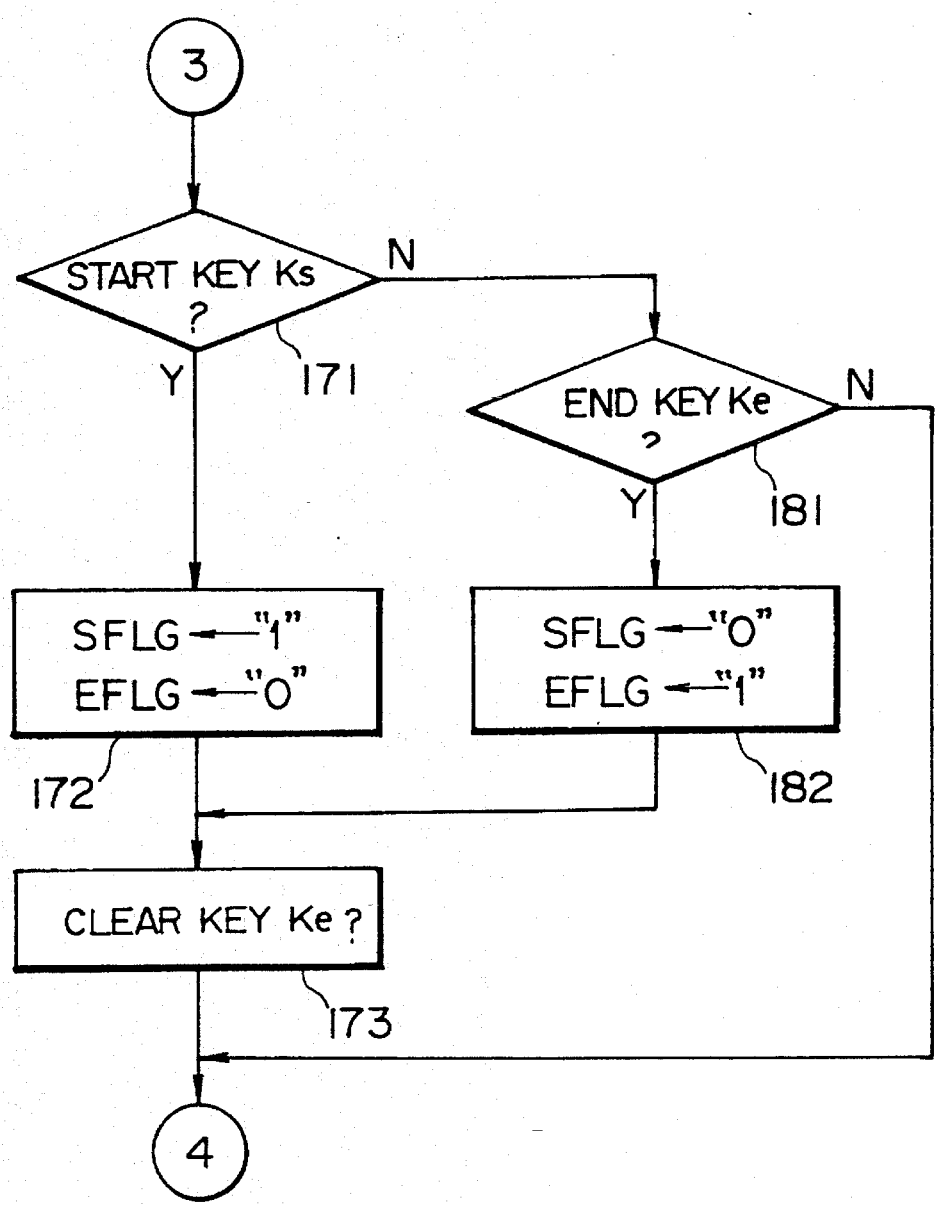

In FIG. 1, reference numerals 1 to 8 denote a synthesizer type receiving circuit including an antenna 1 and an electronic antenna tuner 2. An AM broadcast signal Sr of a desired frequency fr is extracted by the tuner 2 and then is supplied via a high-frequency amplifier 3 to a mixer 4, while an oscillation signal So having a frequency fo of Eq. (i) given below is generated from a voltage-controlled oscillator (VCO) 11.

$$fo = fr + 450 \text{ (kHz)} \quad \text{(i)}$$

The signal So is supplied as a local oscillation signal to the mixer 4, where the signal Sr is frequency-converted to an intermediate-frequency signal of 450 kHz.

Subsequently the intermediate-frequency signal is supplied via an IF amplifier 5 to an AM detector 6, which then extracts an audio signal and supplies the same via a low-frequency amplifier 7 to a loudspeaker 8.

In this stage, the VCO 11 constitutes a phase-locked loop (PLL) 10 in combination with other circuits 12 through 15. More specifically, the signal So outputted from the VCO 11 is supplied to a variable frequency divider 12 to be divided to a signal of 1/N frequency, and the frequency-divided signal thus obtained is supplied to a phase comparator 13. Meanwhile an oscillation signal Sp of a reference frequency 5 kHz is outputted as a reference signal from an oscillator 14 and then is supplied also to the phase comparator 13, whose comparison output is supplied as a control voltage to the VCO 11 via a low-pass filter 15. The output voltage of the filter 15 is supplied as a station selecting voltage to the tuner 2.

Therefore, in a steady state where the frequency of the output of the frequency divider 12 and that of the reference oscillation signal So are equal to each other, the frequency fo of the local oscillation signal So is given by $$fo = 5 \text{ (kHz)} \times N \quad \text{(ii)}$$

In this state, the condition of Eq. (i) is satisfied.

Figures 7, 8:
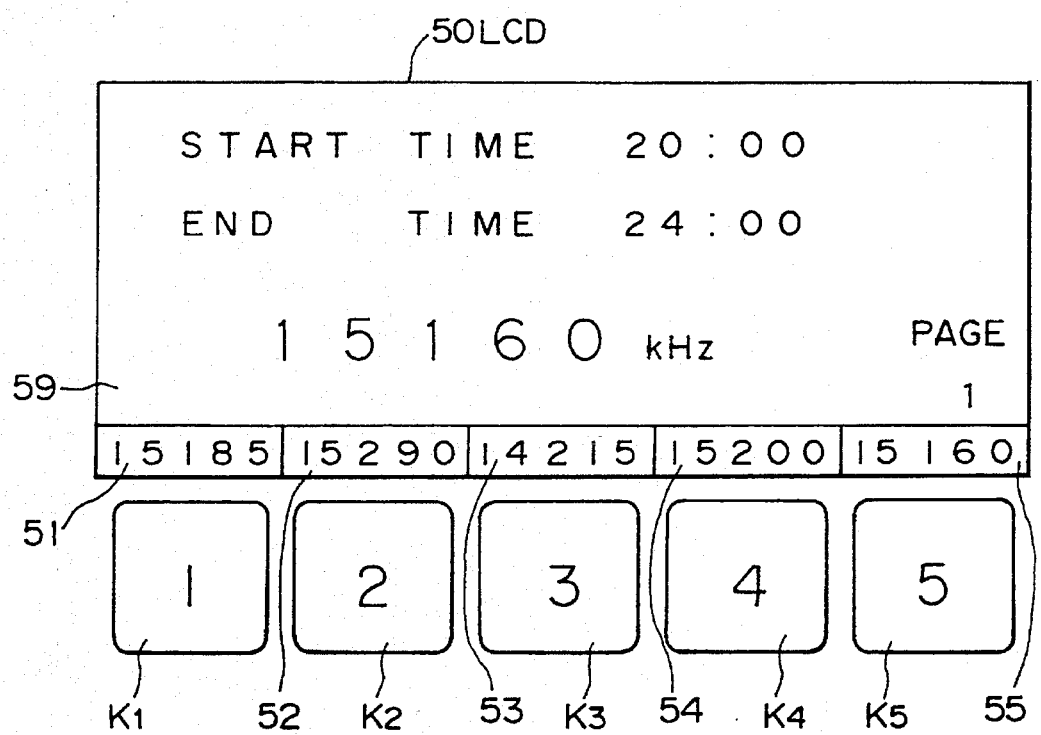
FIG. 7 shows exemplary display contents of a reception frequency and so forth.
FIG. 8 shows exemplary mutual correspondence between frequency division ratios and frequencies.
Figure 9:
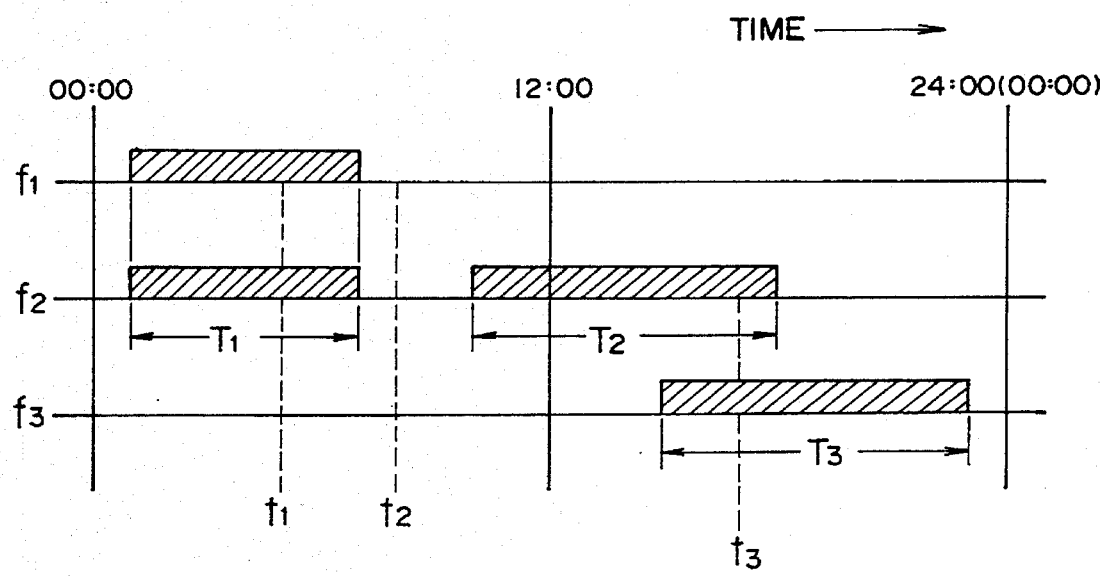
FIG. 9 shows an exemplary frequency table.

Accordingly, if the frequency division ratio N is changed by 1 each time in a range of 411 to 6089 as shown in the 1et row of FIG. 8, it follows that the local oscillation frequency fo is changed at an interval of 5 kHz between 2055 kHz and 30445 kHz as shown in the 2nd row of FIG. 8, whereby the reception frequency fr is changed in conformity with the frequency division ratio N at an interval of 5 kHz in a range of 1605 kHz to 29995 kHz as shown in the 3rd row of FIG. 8.

The frequency division ratio N is set in the frequency divider 12 by a system controlling microcomputer 20 (in this embodiment, 1-chip microcomputer M-37450 made by Mitsubishi Electric Corporation).

The microcomputer 20 comprises a 4-bit CPU 21, a ROM 22 where a processing routine of FIGS. 2 to 5 is written, a RAM 23 having a timer area and a work area, and a memory 24 where a predetermined data table DTBL is written. Such memories 22 to 24 are connected to the CPU 21 via a system bus 29.

The memory 24 is of a nonvolatile type where data can be erased and written electrically, such as an EEPROM or a memory backed up with a battery. The contents of the data table DTBL written in the memory 24 are such as shown in FIG. 6 for example.

The data table DTBL relative to broadcasting stations consists of 20 pages each having a capacity of 5 stations. On each page, there are registered the data of a maximum of 5 stations (5 groups) inclusive of frequency division ratios for receiving broadcasts of certain frequencies, broadcast start times BGNT and end times ENDT.

In FIG. 6, the 4th column indicates reference frequencies fr corresponding to the frequency division ratios N although not included in the table DTBL. Each page of the data table DTBL contains a capacity of 5 stations, but it is not necessary that the entirety of the 5-station data is written, and there may be some blank pages where no data are written at all.

In FIG. 1, there are further shown key interfaces 31 and 32, an output port 33, a timer circuit 41, an LCD driver 42, and an LCD (liquid crystal display) unit 50 for displaying thereon the frequencies, the timer hours and so forth. Such circuits 31 to 33 and 41, 42 are also connected to the CPU 21 via the bus 29.

To the key interface 31, there are connected select keys K1 to K5 for five stations, a page up key Ku and a page down key Kd. Meanwhile to another key interface 32, there are connected numeral keys Kn, a start time key Ks, an end time key Ke, a register key Kr, an execute key Kx and a timer key Kt. Each of the keys K1 to Kt consists of a nonlock type push switch.

The page keys Ku and Kd are used for selecting a page of the data table DTBL, and the select key Ki (where i=1 to 5) for selecting a desired station on the selected page. The numeral keys Kn are used for inputting a frequency or a timer hour; and the start time key Ks and the end time key Ke for setting a start time and an end time of the timer respectively.

Further the register key Kr is used for registering a frequency and so forth, the execute key Kx for directing execution of a desired process, and the timer key Kt for setting a timer reception mode.

FIG. 7 illustrates an exemplary display screen of the LCD unit 50 which is a horizontally elongated rectangle and is divided into an upper wide display area 59 and lower five display areas 51 to 55 arrayed horizontally. In the areas 51 to 55, there are displayed the frequencies of the broadcasting stations registered on the page selected by the page keys Ku and Kd from the 20 pages of the data table DTBL. Meanwhile in the wide area 59, there is displayed the frequency being received or the data relative to the timer reception.

Besides the above, as illustrated in FIG. 7 also, select keys K1 to K5 are disposed under the areas 51 to 55 respectively.

The processes such as timer reservation and timer reception are realized in the following procedure by execution of a routine 100 shown in FIGS. 2 to 5. The following is an exemplary case of receiving a frequency 15160 kHz listed on the 2nd page of the data table DTBL in FIG. 6.

[Key input]

The process executed by the CPU 21 starts with step 101 in the routine 100. At step 102, a decision is made as to whether any of the keys K1 to Kt has been depressed or not. If the result of such decision is negative to signify no depression of any key, the process advances from step 102 to step 109, and the routine 100 is thereby completed.

However, if the result of the decision signifies a depression of any of the keys K1 to Kt, such depression is detected at step 102, and then the process advances from step 102 to step 111 where a decision is made as to whether the depressed one is the page up key Ku or not. If the result signifies that the depressed one is not the page up key Ku, the process advances from step 111 to step 121.

Thereafter the same process as that at step 111 is executed, and then a decision is made at step 121 as to whether the depressed one is the page down key Kd or not. Next a decision is made at step 131 as to whether the depressed one is the select key Ki or not. Subsequently another decision is made at step 141 as to whether the depressed one is the timer key Kt or not. A further decision is made at step 151 as to whether the depressed one is any of the numeral keys Kn or not.

Then at step 161, a decision is made as to whether the depressed one is the execute key Kx or not. Subsequently a decision is made at step 171 as to whether the depressed one is the start time key Ks or not, and finally another decision is made at step 181 as to whether the depressed one is the end time key Ke or not.

Thus, at the steps mentioned above, sequential checks are executed to detect which of the keys has been depressed.

[Selection of station by select key Ki]

Selection of a desired station is performed by using the page keys Ku, Kd and the select key Ki. Namely, a depression of the page up key Ku is detected at step 111, and the process advances from step 111 to step 112 where a page pointer Pn for designating the page of the data table DTBL is incremented by 1. In this case, the 20th page is changed to the 1st page when incremented.

Subsequently the process advances to step 113 where the entire frequency division ratios N registered on the page designated by the page pointer Pn in the data table DTBL are converted to frequency indicating data, which are then transferred to the driver 42. Consequently the frequencies of the entire broadcasting stations registered on the selected page are displayed in the areas 51 to 55 of the LCD unit 50 through the driver 42.

Thereafter the process by the CPU 21 is terminated at step 109, and the routine 100 is thus completed. Accordingly, each depression of the page up key Ku sequentially selects the pages of the data table DTBL in the forward direction while the frequencies of the broadcasting stations registered on that page are displayed on the LCD unit 50.

Meanwhile the depression of the page down key Kd is detected at step 121, and then the process advances from step 121 to step 122 where the page pointer Pn in the data table DTBL is decremented by 1. In this case, the 1st page is changed to the 20th page when decremented.

Subsequently the process advances to step 123 where the entire frequency division ratios N registered on the page designated by the page pointer Pn in the data table DTBL are converted to frequency data, which are then transferred to the driver 42. Consequently the frequencies of the entire broadcasting stations registered on the designated page are displayed in the areas 51 to 55 of the LCD unit 50.

Thereafter the process by the CPU 21 is terminated at step 109, and the routine 100 is thus completed.

Therefore any desired page of the data table DTBL can be selected by depressing the page key Ku or Kd, and the frequencies of the entire stations registered on the designated page are displayed in the areas 51 to 55 of the LCD unit 50. Consequently it becomes possible to select the page, where the desired station is registered, by manipulating the page keys Ku and Kd while confirming the contents displayed on the LCD unit 50.

In this example where the desired frequency is 15160 kHz, the 2nd page of the data table DTBL is selected by depressing the page key Ku or Kd. With such selection, as shown in FIG. 7 also, the frequencies of the stations registered on the 2nd page are digitally displayed in the areas 51 to 55 of the LCD unit 50.

When the frequency of the desired station has been displayed in one of the areas 51 to 55, the station select key Ki disposed under that area is depressed.

In this exemplary case where the frequency to be selected is 15160 kHz, the numerals and characters "15160 kHz" are displayed in the area 55. Therefore the user depresses the select key K5 disposed under the area 55 to select the station transmitting at 15160 Khz.

Then, the depression of the select key Ki (key K5 in this example) is detected at step 131, and the process by the CPU 21 advances from step 131 to step 132 where a decision is made as to whether the register key Kr has been depressed or not. Since it is not depressed in this case, the process advances from step 132 to step 133 for reading out the frequency division ratio N, the broadcast start time BGNT and the broadcast end time ENDT in the row, which corresponds to the depressed select key Ki, on the displayed page of the data table DTBL.

Due to the depression of the select key K5 in this example where the frequencies of the broadcasting stations registered on the 2nd page of the data table DTBL are displayed, there are read out the frequency division ratio "3122", the broadcast start time "2000" and the broadcast end time "2400" of the station registered in the 5th row on the 2nd page.

Subsequently at step 134, the frequency division ratio N read out at step 133 is set in the frequency divider 12 via the port 33 while being converted to frequency data and supplied to the driver 42. Thereafter the process advances to step 109.

Accordingly the frequency to be received is the value determined by the ratio N thus set, and such reception frequency is digitally displayed in the area 59 of the LCD unit 50. In this example, the ratio N of the frequency divider 12 is set to "3122", so that a frequency 15160 kHz is determined to be the reception frequency, and the numerals and characters "15160 kHz" are displayed in the area 59 of the LCD unit 50.

In case the present time indicated by the timer circuit 41 is included between the broadcast start time BGNT and the broadcast end time ENDT obtained from the data table DTBL, characters "ON AIR" are additionally displayed on the LCD unit 50.

Thus, any of the broadcasting stations registered on the data table DTBL can be selected by depressing the page keys Ku, Kd and the select key Ki.

[Timer reservation]

In this mode, first a desired broadcasting station to be received by means of the timer is selected according to the procedure of the above "Selection of station by select key Ki", and the timer key Kt is depressed simultaneously with depression of the execute key Kx.

Then the depression of the timer key Kt is detected at step 141, and the process advances from step 141 to step 142 where a decision is made as to whether the execute key Kx has been depressed or not. Since it is depressed in this stage, the process advances from step 140 to step 143 where, out of the entire data of the table DTBL, the frequency division ratio N, the broadcast start time BGNT and the broadcast end time ENDT of the station presently selected are transferred to a timer address TMER prepared in the RAM 23.

Suppose now that a frequency 15160 kHz on the 2nd page of the data table DTBL is selected for example, and the timer key Kt is depressed simultaneously with depression of the execute key Kx. In this case, the data of a frequency division ratio "3122", a start time "2000" and an end time "2400" are transferred to the timer address TMER of the RAM 23.

Subsequently at step 144, the data thus transferred are supplied also to the driver 42 so that, as shown in FIG. 7 for example, the content of the timer reservation is displayed on the LCD unit 50, and then the process advances to step 109.

If a power switch (not shown) is turned off, the circuits including the microcomputer 20 required for the timer reception mode are kept energized, while the receiving circuits 1 to 8 are switched off to stand by for a next timer reception.

[Timer reception]

When the receiver is retained on standby for a timer reception, an interrupt is applied from the timer circuit 41 to the CPU 21 every minute for example. Upon input of such interrupt, the CPU 21 compares the present time indicated by the timer circuit 41 with the broadcast start time BGNT stored in the timer address TMER of the RAM 23. If no coincidence is attained therebetween, the CPU 21 terminates the interrupt.

However, when there is attained, after the lapse of time, a coincidence between the present time indicated by the timer circuit 41 and the broadcast start time BGNT stored in the timer address TMER of the RAM 23, the CPU 21 supplies a power to the circuits 1 to 8 required for reception of the broadcast while reading out the frequency division ratio N from the timer address TMER of the RAM 23, and sets the ratio N in the frequency divider 12. Further the ratio N is converted to data indicative of the reception frequency, and then the data is supplied to the driver 42.

Therefore, upon arrival of the broadcast start time BGNT preset by the procedure of "timer reservation", the receiver is placed in a state to receive the broadcast of the frequency division ratio N preset by the timer reservation.

In this example, a frequency 15160 kHz is selected with setting of a frequency division ratio "3122", a start time "2000" and an end time "2400" in the timer address TERM of the RAM 23 as mentioned. Accordingly, at "20:00" o'clock, the frequency division ratio "3122" is set in the frequency divider 12, so that the receiver is placed in the state for receiving the frequency "15160 kHz" which corresponds to the frequency division ratio "3122". Such data are displayed on the LCD unit 50 as shown in FIG. 7.

Thus, the desired broadcast is received upon arrival of the start time of the timer reception mode.

In such timer reception mode, the CPU 21 compares, in response to a similar interrupt, the present time indicated by the timer circuit 41 with the broadcast end time ENDT stored in the timer address TMER of the RAM 23, and terminates the interrupt if no coincidence is attained therebetween.

Subsequently, the present time indicated by the timer circuit 41 comes to coincide with the broadcast end time ENDT stored in the RAM 23. Then the CPU 21 switches off the power for the circuits 1 to 8 required for receiving the broadcast. In this example where the end time "2400" is stored in the timer address TMER of the RAM 23, the receiver is switched off at 24:00 o'clock.

[Confirmation of content of timer reservation]

This operation is performed by first turning on the power switch and depressing the timer key Kt. Then the depression of the timer key Kt is detected at step 141, and the process advances from step 141 to step 142. Since the register key Kr is not depressed in this stage, the process further advances from step 142 to step 145 for reading out the data stored in the timer address TMER, i.e., the frequency division ratio N, the broadcast start time BGNT and end time ENDT.

The frequency division ratio N thus read is set in the frequency divider 12 while being converted to data indicative of the reception frequency. Such frequency data is supplied to the driver 42 together with the broadcast start time BGNT and end time ENDT, and thereafter the process advances to step 109.

Accordingly the station set for the timer reception is picked up as desired, and simultaneously the frequency, broadcast start time and end time thereof are displayed on the LCD unit 50.

Thus, the content of the timer reservation can be confirmed by depressing the timer key Kt.

[Selection of station by numeral keys Kn]

First, numerals of a desired frequency to be received are inputted from the numeral keys Kn. More specifically, when any numeral key Kn is depressed, such depression is detected at step 151, and the process advances from step 151 to step 152 where the number corresponding to the numeral of the depressed one of the numeral keys Kn is set in a buffer BUFF prepared in the RAM 23. Thereafter the process advances to step 109.

Accordingly, when a desired frequency to be received is 15160 kHz, "1", "5", "1", "6", "0" of the numeral keys Kn are sequentially depressed. Then the numerals "15160" thus inputted are set in the buffer BUFF.

After inputting the frequency, the execute key Kr is depressed. Then such depression is detected at step 161, and the process advances from step 161 to step 162 where a timer start flag SFLG is checked. As will be described later, the flag SFLG is turned to "1" when setting the timer-reception start time or to "0" as in this case.

Since the flag SFLG is "0" in this stage, the process advances from step 162 to step 163 where a timer end flag EFLG is checked. As will be described later, the flag EFLG is turned to "1" when setting the timer-reception end time or to "0" as in this case.

Since the flag EFLG is "0" in this stage, the process advances from step 163 to step 164 where the number set in the buffer BUFF is converted to a corresponding frequency division ratio N. Subsequently at step 165, the resultant frequency division ratio N is set in the frequency divider 12. Meanwhile the number set in the buffer BUFF is supplied to the driver 42.

Accordingly, there is selected the broadcasting station of the frequency corresponding to the number set in the buffer BUFF, and the frequency is digitally displayed in the area 59 of the LCD unit 50. In this example where "15160" is set in the buffer BUFF, the frequency 15160 kHz is selected while being displayed on the LCD unit 50. Thereafter the buffer BUFF is cleared at step 166, and then the process advances to step 109.

In this manner, the frequency of the desired station is inputted by depressing the numeral keys Kn, and the station of the input frequency is picked up by subsequently depressing the execute key Kx.

[Registration on data table DTBL]

In this operation, first a desired station to be registered is selected by the above-described procedure for "Selection of station by numeral keys Kn".

Further the start time key Ks is depressed and, after inputting the broadcast start time from the numeral keys Kn, the execute key Kx is depressed.

Then the depression of the start time key Ks is detected at step 171, and the process advances from step 171 to step 172 where the timer start flag SFLG is set to "1" while the timer end flag EFLG is reset to "0". Next at step 173, the buffer BUFF in the RAM 23 is cleared, and then the process advances to step 109.

Subsequently the depression of the numeral keys Kn is detected at step 151, and similarly to the foregoing case, the number indicating the broadcast start time inputted from the numeral keys Kn is set in the buffer BUFF.

Finally, the depression of the execute key Kx is detected at step 161, and the process advances from step 161 to step 162. Since the flag SFLG is set to "1" at step 172 in this case, the process advances from step 162 to step 167 where the number indicating the broadcast start time set in the buffer BUFF is transferred to a second buffer area BUF2 of the RAM 23.

Subsequently at step 168, both flags SFLG and EFLG are reset to "0", and after the buffer BUFF is cleared at step 166, the process advances to step 109.

Next the end time key Ke is depressed and, after inputting the broadcast end time from the numeral keys Kn, the execute key Kx is depressed.

Then the depression of the end time key Ke is detected at step 181, and the process advances from step 181 to step 182 where the timer start flag SFLG is reset to "0" while the timer end flag EFLG is set to "1". Subsequently the buffer BUFF of the RAM 23 is cleared at step 173, and then the process advances to step 109.

Thereafter the depression of the numeral keys Kn is detected at step 151, and similarly to the foregoing case, the numerals indicating the broadcast start time inputted from the numeral keys Kn are set in the buffer BUFF.

Finally, the depression of the execute key Kx is detected at step 161, and then the process advances from step 161 to step 162. Since the flag SFLG is reset to "0" at step 182 in this example, the process advances from step 162 to step 163. In this case, due to EFLG="1" at step 182, the process advances from step 163 to step 169 where the number indicating the broadcast end time in the buffer BUFF is transferred to a third buffer area BUF3 of the RAM 23.

Subsequently the process advances through steps 168 and 166 to step 109.

The above procedure prepares the frequency (frequency division ratio N), start time BGNT and end time ENDT of the desired broadcast.

Thereafter a page of the data table DTBL having any blank row is selected by depressing the page key Ku or Kd. Subsequently one of the select keys Ki corresponding to the desired broadcasting station to be registered is depressed simultaneously with depression of the register key Kr.

Then the depression of the select key Ki is detected at step 131, and the process advances from step 131 to step 132. Since the register key Kr is also depressed in this stage, the process further advances from step 132 to step 135 where the frequency division ratio N set in the frequency divider 12, the start time BGNT and the end time ENDT prepared in the buffer areas BUF2 and BUF3 of the RAM 23 are registered in the row on the selected page of the data table DTBL corresponding to the select key Ki.

For example, if the register key Kr is depressed simultaneously with depression of the select key K5 under the condition that the 1st page of the data table DTBL is selected, the frequency division ratio N, the start time BGNT and the end time ENDT are registered in the 5th row on the 1st page of the data table DTBL.

Thereafter the process advances to step 109.

Accordingly, the desired frequency, broadcast start time and end time are registered on the data table DTBL by the above manipulation of the keys.

The station selection and the timer reception can be performed in the manner described above. In this case, the broadcasting station registered on the data table DTBL is designated by the select key Ki, and the timer key Kt is depressed simultaneously with depression of the register key Kr. Then the data of the frequency division ratio N, the broadcast start time BGNT and so forth for receiving the designated station are transferred to the timer address TMER of the RAM 23. And upon coincidence between the preset time of the timer circuit 41 and the broadcast start time BGNT transferred to the timer address TMER, the frequency division ratio N transferred to the timer address TMER is set in the frequency divider 12 so that the broadcast is received.

Therefore, in the operation for timer reservation, there is no practical necessity of inputting the frequency or the broadcast start time, thereby facilitating the timer reservation remarkably and enabling even a beginner, as well as a mania or veteran user, to receive the desired broadcasting station with ease and certainty in the timer reception mode.

Also in the ordinary reception mode, a desired station can be picked up merely by selecting the relevant page of the data table DTBL with manipulation of the page key Ku or Kd and depressing the select key Ki corresponding to the station, so that any station is selectable with facility.

Besides the above, even when a program is being broadcast at a multiplicity of frequencies from one station, it is not necessary to provide individual select keys Ki for each of such frequencies, hence eliminating the existence of numerous select keys on the control panel of the receiver.

The embodiment mentioned above may be so modified as to include keys or dials to select characters so that, in registration of data on the data table DTBL, character codes representing the names and so forth of individual broadcast stations are selected by such keys or dials and are registered on the data table DTBL together with the data inclusive of the frequency division ratios N. It may also be so contrived that, in registration on the data table DTBL, the data of the desired broadcasting station is written over the data already registered.

In addition, it is further possible to classify stations (frequency division ratios N), broadcast start times BGNT and end times ENDT by the genres of programs in such a manner as to register, for example, news on the 1st page of the data table DTBL, music on the 2nd page, sports on the 3rd page and so forth.

According to the present invention, when the timer key Kt is depressed simultaneously with depression of the register key Kr after designating, by the select key Ki, one of the broadcasting stations registered on the data table DTBL, then the data including the frequency division ratio N and the broadcast start time BGNT for receiving the designated station are transferred to the timer address TMER of the RAM 23. And upon coincidence of the hour of the timer circuit 41 with the broadcast start time BGNT transferred to the timer address TMER, the frequency division ratio N transferred also to the timer address TMER is set in the frequency divider 12 so that the designated broadcast is received.

Consequently, in the timer reception mode, it is not necessary to input the frequency or the broadcast start time practically to thereby facilitate the timer reservation. Thus, even a beginner as well as a mania or veteran user is rendered capable of easily picking up the desired station without fail in the timer reception mode.

What is claimed is:

1. A shortwave radio receiver of synthesizer type having a phase-locked loop therein and wherein a desired broadcasting station is selected by frequency conversion of a reception signal in conformity with an oscillation signal obtained from said phase-locked loop, said receiver comprising:

a data table having entries including frequency data for receiving programs from shortwave broadcasting stations, and time data indicative of the broadcast start time and end time of each station, said entries being arranged in pages with a plurality of entries per page;

a data entry keyboard for manually entering said frequency data, said start time and said end time into said data table;

a timer circuit for producing a time;

a memory for the timer circuit; and a plurality of station select keys, each associated with one of said plurality of entries stored in each page of said table;

wherein, when desired frequency data of a designated station has been selected out of said data table by depressing one of said select keys, said selected frequency data and said start and end times corresponding thereto are read out from said data table and are written in said timer memory;

and in a timer reception mode, the time indicated by said timer circuit is compared with the start time written in said timer memory, and when a coincidence is attained therebetween, the frequency data written in said timer memory is supplied to said phase-locked loop to select and pick up the designated station.

2. The receiver of claim 1, wherein said frequency data includes divide ratio data.

3. The receiver of claim 1, wherein said phase locked loop includes a divider and wherein said frequency data includes said divide ratio data for setting said divider to a divide ratio for each broadcasting frequency.

4. The receiver of claim 3, wherein said divide ratio is provided to said divider when said start time stored in said timer memory is equal to said time indicated by said timer circuit.

5. The receiver of claim 1, further comprising a microcomputer including a random access memory and an EEPROM, and wherein said timer memory and said data table are stored in said random access memory and said EEPROM respectively.

6. The receiver of claim 1, further comprising display means for displaying a representation of said frequency data and said time data.

7. A synthesized shortwave radio receiver having a phase-locked loop therein and wherein a desired broadcasting station is selected by frequency conversion of a reception signal in conformity with an oscillation signal obtained from said phase-locked loop, said receiver comprising:

a data table containing:
frequency data including divide ratio data, the frequency data representing receive frequencies for receiving programs from shortwave broadcasting stations,
start time data indicative of the broadcast start time for each station, and
end time data indicative of the broadcast end time for each station;

said data table arranged in twenty memory pages of five stations per page;

a display;

a data entry keyboard for manually entering said frequency data, said start time and said end time into said data table;

a page selection key for selecting a page of said memory pages, and for displaying the frequency of each station in said selected page of said memory pages on said display;

a timer circuit for producing a time;

a memory for the timer circuit; and five station select keys, for selecting one of said five displayed frequencies and for displaying on said display the start time and end time associated with said selected station;

wherein, when desired frequency data of a designated station is selected out of said data table by depressing one of said station select keys, said selected frequency data and said start and end time data corresponding thereto are read out from said data table and are written in said timer memory.

8. The apparatus of claim 7, wherein in a timer reception mode, the time indicated by said timer circuit is compared with the start time data written in said timer memory, and when a coincidence is attained therebetween, the frequency data written in said timer memory is supplied to said phase-locked loop to thereby select and pick up the designated station.

9. The apparatus of claim 7, wherein each of said five station select keys is associated with each of the five stations selected by said page selection key, for selecting one of said five displayed frequencies.

10. The apparatus of claim 7, further comprising means for converting said divide ratio data to a frequency for display on said display.

11. The apparatus of claim 8, further comprising means for comparing a current time with said start time and said end time data associated with said selected frequency data and for displaying a message on said display indicating that said station associated with said selected frequency data is currently broadcasting.

12. A synthesized shortwave radio receiver having a phase-locked loop therein and wherein a desired broadcasting station is selected by frequency conversion of a reception signal in conformity with an oscillation signal obtained from said phase-locked loop, said receiver comprising:

a data table containing:
frequency data including divide ratio data, the frequency data representing receive frequencies for receiving programs from broadcasting stations,
start time data indicative of the broadcast start time for each station, and
end time data indicative of the broadcast end time for each station;

said data table arranged in twenty memory pages of five stations per page;

a display;

a data entry keyboard for manually entering said frequency data, said start time and said end time into said data table;

means for converting said divide ratio data to a frequency for display on said display a page selection key for selecting a page of said memory pages, and for displaying the frequency of each station in said selected page of said memory pages on said display;

a timer circuit for producing a time;

a memory for the timer circuit;

five station select keys, each key is one associated with each of the five stations selected by said page selection key, for selecting one of said five displayed frequencies and for displaying the start time and end time associated with said selected station on said display;

means for comparing a current time with said start time and said end time data associated with said selected frequency and for displaying a message on said display indicating that said station associated with said selected frequency is currently broadcasting;

wherein, when desired frequency data of a designated station is selected out of said data table by depressing one of said station select keys, said selected frequency data and said start and end time data corresponding thereto are read out from said data table and are written in said timer memory; and wherein in a timer reception mode, the time indicated by said timer circuit is compared with the start time data written in said timer memory, and when a coincidence is attained therebetween, the frequency data written in said timer memory is supplied to said phase-locked loop to thereby select and pick up the designated station.

* * * * *